US012074905B2

(12) United States Patent
Shachar et al.

(10) Patent No.: US 12,074,905 B2
(45) Date of Patent: Aug. 27, 2024

(54) SYSTEMS AND METHODS FOR DETECTING RANSOMWARE ATTACKS ON FILE SHARING SYSTEMS

(71) Applicant: Dell Products, L.P., Round Rock, TX (US)

(72) Inventors: Tomer Shachar, Omer (IL); Maxim Balin, Gan-Yavne (IL); Yevgeni Gehtman, Modi'in (IL)

(73) Assignee: Dell Products, L.P., Round Rock, TX (US)

( * ) Notice: Subject to any disclaimer, the term of this patent is extended or adjusted under 35 U.S.C. 154(b) by 294 days.

(21) Appl. No.: 17/648,734

(22) Filed: Jan. 24, 2022

(65) Prior Publication Data

US 2023/0262089 A1    Aug. 17, 2023

(51) Int. Cl.
*H04L 9/40* (2022.01)
*G06F 21/55* (2013.01)

(52) U.S. Cl.
CPC ........ *H04L 63/1466* (2013.01); *G06F 21/554* (2013.01); *G06F 21/55* (2013.01); *H04L 63/0884* (2013.01); *H04L 63/145* (2013.01)

(58) Field of Classification Search
CPC .... G06F 21/554; G06F 16/1734; G06F 21/55; H04L 63/1466; H04L 63/145; H04L 63/1416; H04L 63/1408; H04L 63/14
See application file for complete search history.

(56) References Cited

U.S. PATENT DOCUMENTS

| | | | | |
|---|---|---|---|---|
| 8,819,828 | B1* | 8/2014 | Umland | G06F 21/56 726/23 |
| 2005/0223014 | A1* | 10/2005 | Sharma | H04L 67/1097 |
| 2016/0095017 | A1* | 3/2016 | Ely | H04W 16/14 455/454 |
| 2017/0171186 | A1* | 6/2017 | Purushothaman | H04L 63/102 |
| 2021/0365466 | A1* | 11/2021 | Kleiner | G06F 16/156 |
| 2022/0070182 | A1* | 3/2022 | Bowditch | H04L 63/1425 |

OTHER PUBLICATIONS

Moll, Robin E., "Covert Command and Control Using the Server Message Block Protocol." (Apr. 2018)(Year: 2018).*
Lane, Terran, and Carla E. Brodley. "Detecting the abnormal: Machine learning in computer security." (1997). (Year: 1997).*
Smorti, Marco. Analysis and improvement of ransomware detection techniques. Diss. Politecnico di Torino (Year: 2023).*

* cited by examiner

*Primary Examiner* — Benjamin E Lanier
*Assistant Examiner* — Brandon Binczak
(74) *Attorney, Agent, or Firm* — Fogarty LLP

(57) ABSTRACT

Methods and systems for detecting ransomware attacks on an SMB (Server Message Block) file sharing system are disclosed. A user's request for access to the SMB file sharing system is authenticated and an SMB session for the user is initiated. During the SMB session, SMB commands issued by the user are detected and logged. The detected commands are evaluated against a profile of normal file sharing activity by this user. In case a deviation from the user's activity profile is detected, recent SMB commands from the user are evaluated against a library of patterns of SMB commands indicative of ransomware activity. In case the recent SMB commands from the user match a ransomware command pattern, the user's SMB session is immediately terminated, thus mitigating further damage by the ransomware.

18 Claims, 3 Drawing Sheets

SYSTEMS AND METHODS FOR DETECTING RANSOMWARE ATTACKS ON FILE SHARING SYSTEMS

FIELD

The present disclosure generally relates to file sharing systems (FSS), and more particularly to security management in a file sharing system (FSS).

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

File sharing system enable individuals and businesses to store and share information that is organized into files. A file sharing system may be used to store and share information for a wide variety of business and personal purposes, thereby allowing users to take advantage of the value of the information. Because technology and file sharing needs and requirements vary between different users or applications, file sharing systems may also vary regarding types of information that are shared, how often the shared information is accessed, how much information is shared and how quickly and efficiently the data may be shared. In addition, file sharing may be implemented using variety of IHSs that may be configured to store and share file-based data, and that may include one or more computer systems, data storage systems, and networking systems.

Security of the information or data stored in file sharing systems is critical. More recently, data theft and cyber-attacks in form of ransomware are increasing concerns. In ransomware attacks, stored data may be encrypted or otherwise locked by a malicious actor that demands payment in order for the data to be relinquished. In some file sharing systems, any user with access to stored data could initiate a ransomware attack. Various security methods be deployed in order to detect ransomware attacks, but these tools are particularly ineffective in preventing ransomware attacks by malicious actors that have compromised the accounts of authorized users. Accordingly, effectively defending against ransomware attacks includes detecting and mitigating ongoing ransomware attacks.

SUMMARY

Ransomware attacks in an enterprise computer network may be especially devastating because of the prevalence of file sharing among users of enterprise systems. In an enterprise (e.g., government, university, company, or other organization), several users may share access to the same file that is stored on an IHS, such as a central file server. To access a shared file stored in the data storage of the server, a client IHS may mount the shared data storage of the server for use as a remote storage. Once mounted the user of the IHS may access the remote storage to perform remote file operations (e.g., read and write) on the shared file over the network.

As described in additional detail below, file sharing system may be implemented using data center resources, including enterprise file servers. Due to security protocols implemented in data center, it is common for the file servers themselves to be infected by malware. However, in file sharing scenarios, a ransomware attacker running on a compromised client IHS may remotely access and corrupt shared files stored in the file server. The infection of the shared file typically does not affect the operating system of the file server, and may not affect the operation of the file server in any easily discernable manner. As such, the remote access to the shared file by a ransomware attacker may appear to be normal file operations. Accordingly, ransomware attackers may go undetected for prolonged periods of time, since security protocols of the file server may fail to detect the corruption of shared files.

There are two main types of ransomware attacks that are presently threats. Locker ransomware locks an IHS or device, in some cases rendering the IHS and/or device unusable. Crypto ransomware prevents access to data by its owner through encryption of the data using cryptographic credentials controlled by the malicious actor. The goal of ransomware is typically to convince the victim to pay a ransom, often in untraceable cryptocurrency, to unlock their data. Due to the account of any authorized user of a file sharing system being potentially used to initiate a ransomware, preventing ransomware attacks is challenging. Accordingly, embodiments provide an innovative approach to detecting and mitigating ransomware activity within certain file sharing systems.

The SMB (Server Message Block) protocol specifies a communication protocol for file sharing systems. In particular, the SMB protocol provides remote users with access to a shared file system, where SMB defines the responses and requests that support this remote access to the shared file system. In various embodiments, methods and systems for detecting ransomware attacks on an SMB (Server Message Block) file sharing system are disclosed. The methods and systems may authenticate a user's request for access to the SMB file sharing system. When the user is successfully authenticated, an SMB session for the user is initiated. During the SMB session, SMB commands issued by the user are detected. The detected commands are evaluated against an activity profile for the user. In case a deviation from the user's activity profile is detected, the recent SMB commands from the user against are compared with a library of ransomware command patterns. In case, the recent SMB commands from the user match a ransomware command pattern, the user's SMB session is terminated.

In some embodiments, the SMB commands received from the user may comprise all SMB commands from the user during an SMB session. The recent SMB commands received from the user may comprise QUERY_INFO and OPLOCK_BREAK SMB commands during the SMB session. In some embodiments, the matched ransomware command pattern may comprise repeated sequences of a QUERY_INFO command followed directly by an OPLOCK_BREAK command. In some embodiments, the SMB commands from the user received may comprise TREE_CONNECT, READ and WRITE SMB commands during the SMB session. In some embodiments, the matched ransomware command pattern may comprise repeated sequences, issued by the user during the SMB session, of a TREE_CONNECT command directly followed by a READ command directly followed by a WRITE command. In some embodiments, the deviation from the user's activity profile may be detected in case the SMB commands comprises an OPLOCK_BREAK command and when the user's activity profile indicates no prior use of OPLOCK_BREAK commands by the user. In some embodiments, the deviation from the user's activity profile may be detected in case there is a detection of an increase in frequency of SMB commands issued by the user. In an embodiment, the increase in frequency of SMB commands issued by the user is in comparison to a frequency of SMB commands issued by the user during prior SMB sessions. In some embodiments, the user's request for access to the SMB file sharing system is authenticated by an Active Directory Identity Provider.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details. Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present invention have been illustrated and described, the invention is not limited to these embodiments only. Numerous modifications, changes, variations, substitutions, and equivalents will be apparent to those skilled in the art, without departing from the scope of the invention, as described in the claim.

File sharing systems may be implemented in datacenter environments comprises of IHSs of various types. For instance, a datacenter may include rack-mounted servers that are stacked and installed within an enclosure, which may then be installed in a rack. A file sharing client application may be used to access the datacenter and share, transfer or modify the data stored in the datacenter. The datacenters may be accessed through file sharing system which may be supervised by teams of remote and local administrators working in shifts in order to support around-the-clock availability of the datacenter operations while minimizing downtime. Identifying and resolving technical issues in such an environment is challenging. In response, recent IT management has seen many enterprise workloads shift from private datacenter deployments to the use of cloud solutions that offering on-demand virtual resources. Cloud deployments offer advantages over private datacenter management, such as lower barriers to entry, lower capital expenditures, and the ability to scale services dynamically according to real-time demand. However, due to increased reliance in cloud deployments on virtualized resources and distributed administration, ransomware attacks are especially difficult to detect in file sharing system that are implemented in such environments.

Figure 1:
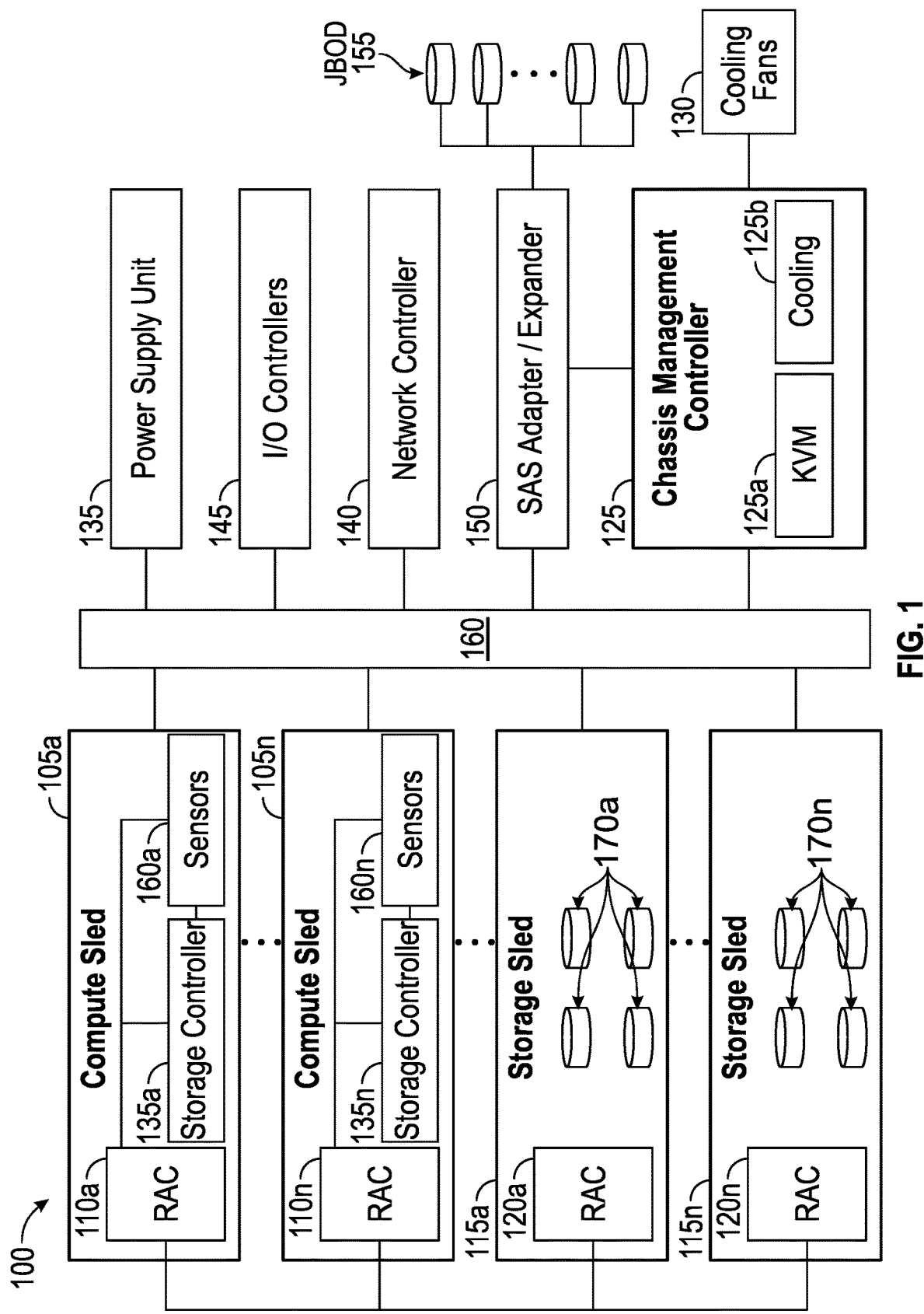
FIG. 1 is a block diagram illustrating components of a chassis, according to some embodiments, for detecting ransomware attacks on file sharing systems implemented using components of the chassis.

FIG. 1 is a block diagram illustrating certain components of a chassis 100 comprising one or more compute sleds 105a-n and one or more storage sleds 115a-n that may be configured to implement the systems and methods described herein for detecting ransomware attacks on file sharing systems implemented using components of the chassis. Chassis may include one or more bays that each receive an individual sled (that may be additionally or alternatively referred to as a tray, blade, server, drive and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the ongoing operations of the other sleds installed in the chassis 100.

Multiple chassis 100 are typically housed within a rack, with each chassis installed in one or more slots of the rack. Datacenters may utilize large numbers of racks, with various different types of rack configurations. The modular architecture provided by the sleds, chassis and racks allow for certain resources, such as cooling, power and network bandwidth, to be shared by the compute sleds 105a-n and storage sleds 115a-n, thus providing efficiency and supporting various types of computational loads.

Chassis 100 may be installed within a rack that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n that are installed within the chassis. A rack and a chassis 100 installed within the rack may utilize various configurations and combinations of cooling fans to cool the sleds 105a-n, 115a-n and other components housed within chassis 100.

The sleds 105*a-n*, 115*a-n* may be individually coupled to chassis 100 via connectors that correspond to connectors provided by front-facing bays of the chassis 100, where these connectors physically and electrically couple an individual sled to a backplane 160 of the chassis, where the backplane may be additionally or alternatively be referred to as a midplane. Chassis backplane 160 may be a printed circuit board that includes electrical traces and connectors that are configured to route signals between components of chassis 100 that are connected to the backplane 160. In various embodiments, backplane 160 may include various additional components, such as cables, wires, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
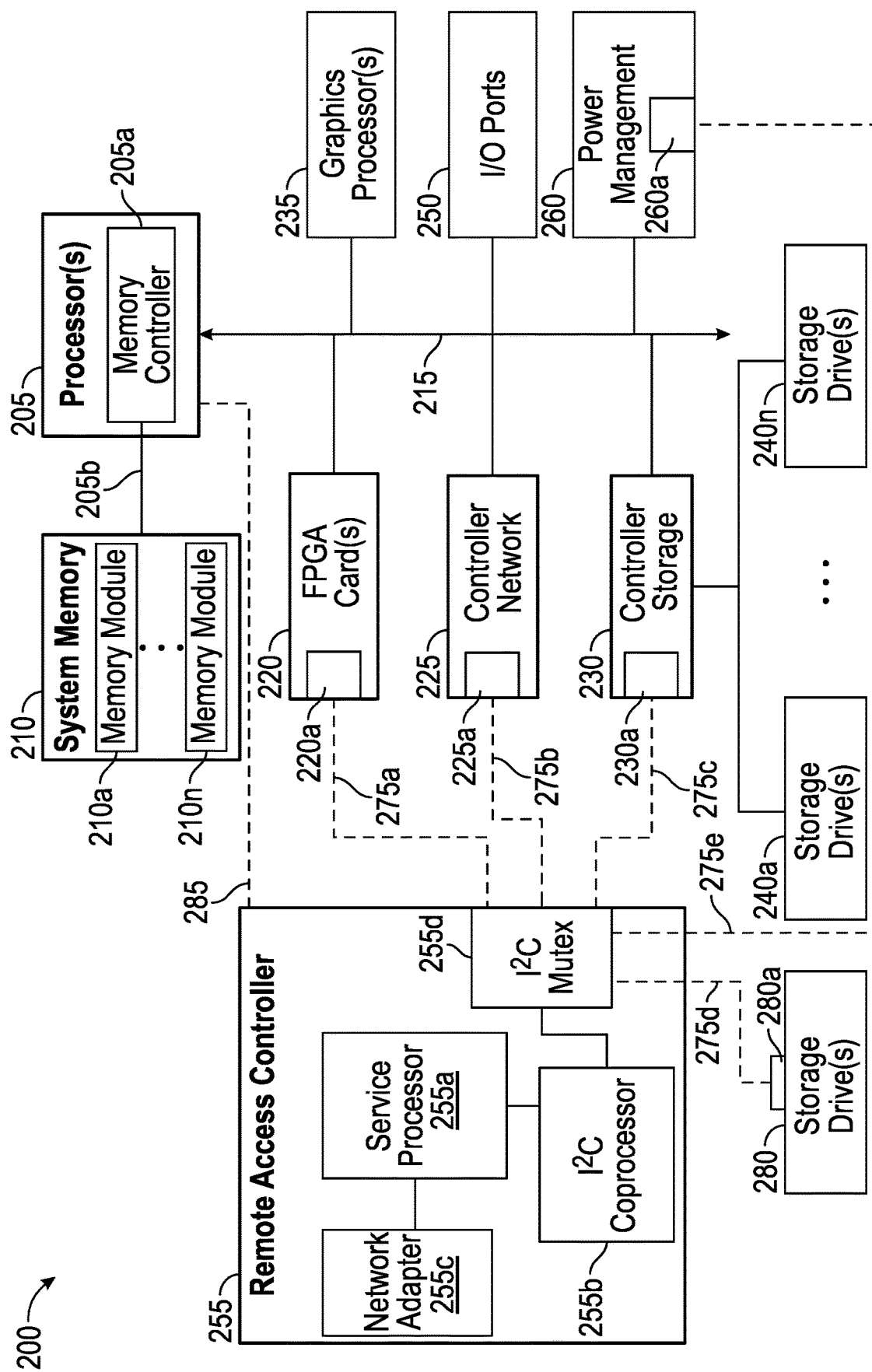
FIG. 2 is a detailed block diagram illustrating the components of an IHS (Information Handling System) configured, according to some embodiments, for detecting ransomware attacks on file sharing systems implemented using components of the IHS.

In certain embodiments, a compute sled 105*a-n* may be an FSS file sharing system (FSS) such as described with regard to FSS 200 of FIG. 2. A compute sled 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As illustrated, each compute sled 105*a-n* includes a remote access controller (RAC) 110*a-n*. As described in additional detail with regard to FIG. 2, each remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications with various components of a compute sled 105*a-n* and datacenter 100. As illustrated, each compute sled 105*a-n* may include one or more sensors 160*a-n* that may generate various types of telemetry data that characterizes aspects of the operation of a respective compute sled 105*a-n*. For instance, sensors 160*a-n* may generate and/or collect telemetry data characterizing the performance of processing, networking, power and/or memory components of a compute sled 105*a-n*, as well as telemetry data from monitoring environmental properties, such as compute sled temperatures. In some embodiments, remote access controller 110*a-n* may track compute sled resource usage by individual virtual machines operating on compute sleds 105*a-n*, thus supporting tracking of compute sled resources used by these virtual machines and in detecting suspicious or otherwise unusual activity by file systems implemented by individual users of file sharing systems that may operate through virtual machines, such as described in additional detail below.

Each of the compute sleds 105*a-n* includes a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150. In some embodiments, storage controller 135*a-n* may track data storage by individual users accessing a file sharing system via compute sleds 105*a-n*, thus supporting tracking of storage resources and detecting activity indicative of a ransomware attacks.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100. As illustrated, each storage sled 115*a-n* may include one or more sensors 165*a-n*. The sensors 165*a-n* may generate various types of telemetry data that characterize aspects of the operation of a respective storage sled 115*a-n*. For instance, sensors 165*a-n* may generate and/or collect telemetry data characterizing the performance of a storage sled 115*a-n*, such as data transfer rates and hard disk drive RPMs, as well as telemetry data from monitoring environmental properties, such as storage sled temperatures. In some embodiments, storage sled 115*a-n* may track SMB activity by individual users accessing an SMB file sharing system that is implemented using the storage resources of storage sleds 115*a-n*, thus supporting tracking of storage resources and detecting activity indicative of a ransomware attack.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some instances, each of the storage drives and the SAS expander may generate telemetry and/or error data that may be reported to a chassis management controller 125.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. As with compute sleds 105*a-n* and storage sleds 115*a-n*, network controller 140 may include one or more sensors 140*a* that may include physical sensors, such as a temperature sensor providing thermal metrics, and logical sensors, such as capabilities reporting metrics of input and output data transfer rates. As with the sensors of compute sleds 105a-n and storage sleds 115a-n, the sensors 140a of network controller 140 may be configured to generate and report this telemetry data.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that provides chassis 100 with redundant, hot-swappable power supply units. Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) 125a capabilities that provide administrators with the ability to interface with the chassis 100.

In addition to providing support for KVM 125a capabilities for administering chassis 100, a chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125. In some embodiments, the operations of a chassis management controller 125 may be implemented by one of the compute sled or storage sled remote access controllers 110a-n, 120a-n that has been designated and configured for managing chassis-level configurations.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An FSS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an FSS is described in more detail below.

FIG. 2 shows an example of an IHS 200 configured to implement systems and methods described herein for detecting ransomware attacks on file sharing systems implemented using components of the IHS. It should be appreciated that although the embodiments described herein may describe an IHS that is a compute sled, server or similar computing component that may be deployed within a rack-mounted chassis, other embodiments may be utilized with other types of IHSs. In the illustrative embodiment of FIG. 2, IHS 200 may be a computing component, such as compute sled 105a-n, that is configured to share infrastructure resources provided by a chassis 100. In some embodiments, IHS 200 may be a server, such as a 1RU (Rack Unit) server, that is installed within a slot of a datacenter, such as a 2RU datacenter, with another 1RU IHS server installed in the other slot of the datacenter.

The IHS 200 of FIG. 2 may be a compute sled, such as compute sleds 105a-n of FIG. 1, that may be installed within a datacenter that may in turn be installed within a rack. Installed in this manner, IHS 200 may utilize shared power, network and cooling resources provided by the datacenter and/or rack. IHS 200 may utilize one or more processors 205. In some embodiments, processors 205 may include a main processor and a co-processor, each of which may include a plurality of processing cores that, in certain scenarios, may be used in operating multiple virtualized computing environments. In certain embodiments, one or all of processor(s) 205 may be graphics processing units (GPUs) in scenarios where IHS 200 has been configured to support functions such as multimedia services and graphics applications.

In some embodiments, processor 205 may be configured to operate as a source of telemetry data providing physical sensor data, such as junction temperatures and power consumption. Processor 205 may also be configured to operate as a source logical telemetry data, such as remaining CPU processing capacity. In some embodiments, processor 205 may be configured by remote access controller 255 to generate telemetry data that is reported to the remote access controller, where the configuration and reporting of this telemetry data may be via a PECI (Platform Environment Control Interface) bus 285 operations.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 200 via a high-speed memory interface 205b. In some embodiments, memory controller 205a may be configured to operate as a source of telemetry data capable of generating reports that are reported to remote access controller 255. The telemetry data reported by memory controller 205a may include metrics such as the amount of available system memory 210 and memory transfer rates via memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory. In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a specific type of removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

In the illustrated embodiments, processor(s) 205 is coupled to a network controller 225, such as provided by a Network Interface Controller (NIC) that is coupled to the IHS 200 and allows the IHS 200 to communicate via an external network, such as the Internet or a LAN. As illustrated, network controller 225 may be instrumented with a controller or other logic unit 225a that supports a sideband management connection 275b with remote access controller 255. Via the sideband management connection 275b, network controller 225 may be configured to operate as a source of telemetry data that may include environmental metrics, such as temperature measurements, and logical sensors, such as metrics reporting input and output data transfer rates.

Processor(s) 205 may also be coupled to a power management unit 260 that may interface with the power system unit 135 of the datacenter 100 in which IHS 200 may be installed. As with network controller 225, power management unit 260 may be instrumented with a controller or other logic unit 260a that supports a sideband management connection 275e with remote access controller 255. Via the sideband management connection 275e, power management unit 255 may be configured to operate as a source of telemetry data that may include physical sensors, such as a sensors providing temperature measurements and sensors providing power output measurements, and logical sensors, such as capabilities reporting discrete power settings.

As illustrated, IHS 200 may include one or more FPGA (Field-Programmable Gate Array) card(s) 220. Each FPGA card 220 supported by IHS 200 may include various processing and memory resources, in addition to an FPGA integrated circuit that may be reconfigured after deployment of IHS 200 through programming functions supported by the FPGA card 220. FGPA card 220 may be optimized to perform specific processing tasks, such as specific signal processing, security, data mining, and artificial intelligence functions, and/or to support specific hardware coupled to IHS 200. FPGA card 220 may include one or more physical and/or logical sensors. As specialized computing components, FPGA cards may be used to support large-scale computational tasks that may result in the FPGA card 220 generating significant amounts of heat. In order to protect specialized FPGA cards from damaging levels of heat, FPGA card 220 may be outfitted with multiple temperature sensors. FPGA card 220 may also include logical sensors that are sources of metric data, such as metrics reporting numbers of calculations performed by the programmed circuitry of the FPGA. The FPGA card 220 may also include a management controller 220a that may support interoperation was the remote access controller 255 via a sideband device management bus 275a.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by BIOS may be implemented, in full or in part, by the remote access controller 255.

IHS 200 may include one or more storage controllers 230 that may be utilized to access storage drives 240a-n that are accessible via the chassis in which IHS 200 is installed. Storage controller 230 may provide support for RAID (Redundant Array of Independent Disks) configurations of logical and physical storage drives 240a-n. In some embodiments, storage controller 230 may be an HBA (Host Bus Adapter) that provides more limited capabilities in accessing physical storage drives 240a-n. In some embodiments, storage drives 240a-n may be replaceable, hot-swappable storage devices that are installed within bays provided by the chassis in which IHS 200 is installed. In some embodiments, storage drives 240a-n may also be accessed by other IHSs that are also installed within the same chassis as IHS 200.

In embodiments where storage drives 240a-n are hot-swappable devices that are received by bays of datacenter, the storage drives 240a-n may be coupled to IHS 200 via couplings between the bays of the chassis and a midplane of IHS 200. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations.

In some embodiment, IHS 200 may be used to implement file sharing systems that utilize the Server Message Block (SMB) file sharing protocol. The Server Message Block protocol is a client-server communication protocol used for sharing access to files, and in some cases other resources, over a network. In a file sharing, the SMB protocol provides the inter-process communications that implement protocols for file-level transactions. The SMB protocol is a network file sharing protocol that allows client applications on a user's IHS to setup and conduct remote file level operations, such as reading and writing shared files. In some embodiments, an SMB file sharing system may be implemented using an IHS 200 in which one or more storage drives 240*a-n* are utilized as shared volumes that are used to implement a file system that is shared through use of SMB commands by users of the file sharing system. In some embodiments, the shared volumes of an SMB file sharing system may utilize storage drives on multiple IHSs, such as storage drives 240*a-n* of multiple IHSs that are similarly configured to IHS 200.

As illustrated, storage controller 230 may be instrumented with a controller or other logic unit 230*a* that supports a sideband management connection 275*c* with remote access controller 255. Via the sideband management connection 275*c*, storage controller 230 may be configured to operate as a source of telemetry data regarding the operation of storage drives 240*a-n*. For instance, controller 230*a* may collect metric data characterizing the performance of individual storage drives 240*a-n*, such as available storage capacity and data transfer rates, as well as environmental properties, such as storage drive temperatures. In some embodiments, a storage controller 230 may be utilized in implementing an fille sharing system that utilizes one of more of storage drives 240*a-n* as shared volumes. In such embodiments, storage controller 230 may monitor SMB commands received from users of the file sharing system. As described below, this collected SMB data may be used to compile a profile of normal file sharing activity by individual users, which may then be used to detect anomalous file sharing activity by that user that is consistent with a ransomware attack. In some embodiments, storage controller 230 may track and maintain a record of recent SMB commands issued by a user of IHS 200, in some instances tracking all SMB commands by a user during an ongoing SMB session. In such embodiments, the session data monitored and collected by storage controller 230 may be used to reverse all SMB commands by a user during and SMB session, such as in response to detecting a ransomware pattern in the SMB commands issued by the user.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

In some embodiments, remote access controller 255 may also be directly coupled via I2C couplings 275*d* with one or more sensors 280, such as sensors that provide measurements of ambient inlet temperatures, outlet airflow temperatures and temperatures at various locations within IHS 200. Sensors 280 coupled directly to remote access controller 255 may also be used in implementing security protocols, such as intrusion detection sensors and user proximity sensors.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 260, 280 of an IHS via a sideband bus interface. For instance, messages utilized in device management may be transmitted using I2C sideband bus connections 275*a-e* that may be individually established with each of the respective managed devices 220, 225, 230, 260, 280 through the operation of an I2C multiplexer 255*d* of the remote access controller. As illustrated, certain of the managed devices of IHS 200, such as FPGA cards 220, network controller 225, storage controller 230 and power management unit 260, are coupled to the IHS processor(s) 205 via an in-line bus 215, such as a PCIe root complex, that is separate from the I2C sideband bus connections 275*a-e* used for device management.

In certain embodiments, the service processor 255*a* of remote access controller 255 may rely on an I2C co-processor 255*b* to implement sideband I2C communications between the remote access controller 255 and managed components 220, 225, 230, 260, 280 of the IHS. The I2C co-processor 255*b* may be a specialized co-processor or micro-controller that is configured to interface via a sideband I2C bus interface with the managed hardware components 220, 225, 230, 260, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-e* is illustrated as single line in FIG. 2. However, each I2C bus 275*a-e* may be comprised of a clock line and data line that couple the remote access controller 255 to I2C endpoints 220*a*, 225*a*, 230*a*, 260*a*, 280*a* on each of the managed components.

As illustrated, the I2C co-processor 255*b* may interface with the individual managed devices 220, 225, 230, 260, 280 via individual sideband I2C buses 275*a-e* selected through the operation of an I2C multiplexer 255*d*. Via switching operations by the I2C multiplexer 255*d*, a sideband bus connection 275*a-e* may be established by a direct coupling between the I2C co-processor 255*b* and an individual managed device 220, 225, 230, 260, 280. In providing sideband management capabilities, the I2C co-processor 255*b* may each interoperate with corresponding endpoint I2C controllers 220*a*, 225*a*, 230*a*, 260*a*, 280*a* that implement the I2C communications of the respective managed devices 220, 225, 230, 260, 280. The endpoint I2C controllers 220*a*, 225*a*, 230*a*, 260*a*, 280*a* may be implemented as dedicated microcontrollers for communicating sideband I2C messages with the remote access controller 255, or endpoint I2C controllers 220*a*, 225*a*, 230*a*, 260*a*, 280*a* may be integrated SoC functions of a processor of the respective managed device endpoints 220, 225, 230, 260, 280.

In some embodiments, remote access controller 255 may utilizes sideband management connections 275*a-e* in detecting various type of events, such as error conditions, and collecting telemetry data from managed devices 220, 225, 230, 260, 280. For instance, remote access controller 255 may detect error condition signals and telemetry transmitted by managed devices 220, 225, 230, 260, 280 via the sideband connections 275*a-e*.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
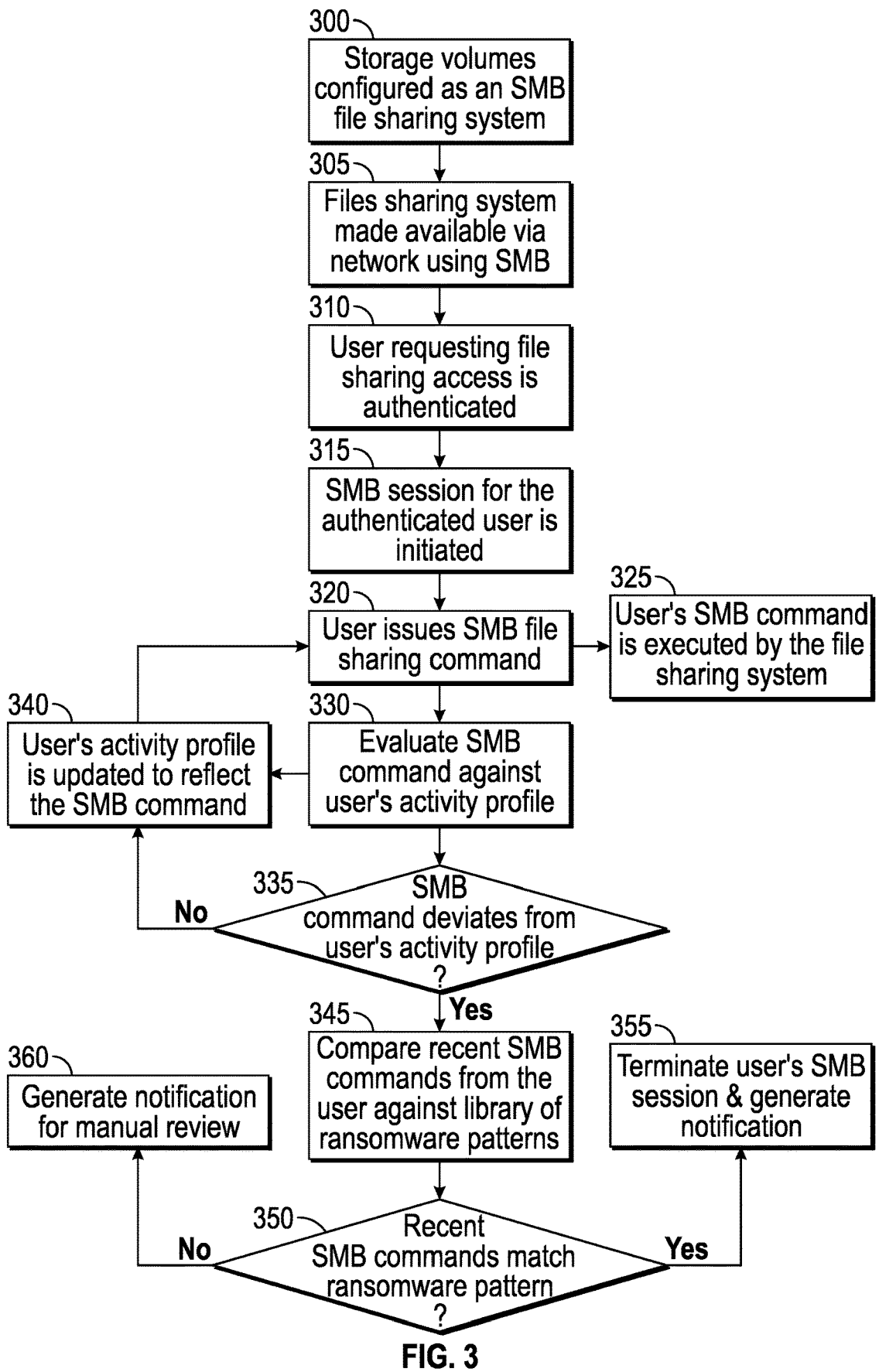
FIG. 3 is a flowchart describing certain steps of a method, for detecting ransomware attacks on file sharing systems.

FIG. 3 is a flowchart describing certain steps of a method, for detecting ransomware attacks on file sharing systems. Some embodiments may begin, at block 300, in configuring one or more storage volumes, such as described above with regard to FIGS. 1 and 2, to operate a file sharing system that utilizes the SMB protocol in providing remote users with shared access to files stored on the volumes. With the SMB file sharing system is configured, at block 305, the shared volumes are made available to users through a network. In some instances, the shared volumes may be populated with files. In other instances, the shared volumes that are made available may be empty and available for file storage.

At block 310, user of the file sharing system may request an access to the FSS by sending an authentication request. In some embodiments, the user may operate a client application that includes a user interface that provides access to shared volumes available via the FSS. In some instances, the user may access the shared volumes via the operating system of the user's IHS that is being used to access the FSS. The authentication request may include credentials for authenticating the user, such as a unique identifier for the user and a corresponding password. In some embodiments, the credentials presented by the user may include a token that was issued to the user by the FSS. In some embodiments, for the user to be successfully authenticated and to establish an SMB session, the client application may utilize a negotiation scheme that may involve transmission one or more SMB_COM_SESSION_SETUP_ANDX requests and responses. In each such communication, the FSS and client application exchange security tokens. The exchange of security tokens may continue until either the client or the server determines that authentication has failed or both sides decide that authentication is complete. In some embodiments, the security token utilized by the user's client application may be token issued by an Active Directory Identity Provider, such that the token serves as credentials that authenticate the user with the operating system in which the client application operates, but which remain valid for a limited duration. In other embodiments, the user may present various other forms of credentials, such as biometric credentials, in requesting access to the FSS. The user may be authenticated by the FSS based on a verification of the presented credentials. Based on a successful authentication for the user, a unique SMB session may be initiated between an IHS, such as a rack mounted server, supporting the FSS and the system (which may also be an IHS) in use by the user.

If the user is successfully authenticated, at block 315, an SMB user session is initiated. The FSS may issue the user a session ID, for use in communicating with the FSS for a defined duration and/or according to various conditions. However, once authenticated and granted a session, the user may issue SMB commands that are supported by the FSS. The SMB protocol supports file sharing through a model where the client sends an SMB request to the server to initiate the session. When the server receives the request, it replies by sending an SMB response with a session ID back to the client, establishing the communication channel. However, once the session ID is revoked, the FSS may be configured to reject any further commands or inputs from this user.

At block 320, an SMB file sharing commands is received from the user by the FSS. At 325, the user-issued SMB command is executed by the FSS, which may include any of the operations supported by the FSS that are authorized under the session ID under which the user is operating. As described in additional detail below, some of the commands may be indicative of being part of an ongoing ransomware attack. In order to determine whether a user is issuing commands as part of such an attack, the FSS monitors the user's SMB commands. Accordingly, an FSS according to embodiments records each command issued by each user. Through this collection of SMB command data, machine-learning models employed by the FSS may be trained for use in detecting ransomware based on models that may be trained using collected command data from the user, command data to similar user and/or command data from generic, where this collected data has been confirmed as normal behavior.

Using these trained machine-learning models, at 330, the FSS evaluates the command received from the user against an activity profile of normal behavior by that user. Through such comparison, deviations from normal behavior by this particular user may be identified by embodiments. A user's activity profile may specify various thresholds of normal behavior by that user. As additional activity by the user is logged and deemed to be normal, the activity profile for the user is progressively updated, allowing the FSS to identify user behavior that falls outside thresholds that are themselves being adapted to better define what is normal behavior by this user. At 335, the FSS identifies SMB commands issued by the user that deviate from normal behavior by that user.

For some embodiments, a deviation from a user's activity profile may be detected based on an increase in frequency of SMB commands issued by the user, or an increase in frequency of a particular SMB command by the user. In other embodiments, a deviation from a user's activity profile may be based on detecting a user issuing SMB commands that have not previously been used by that user, especially with regard to commands that are indicative of ransomware attacks. For instance, a deviation may be indicated by the detection of a user issuing OPLOCK_BREAK commands when that user's activity profile indicates no prior use of OPLOCK_BREAK commands. In a ransomware attack, malware may be programmed to iterate through all files found in the shared volume, or at least though certain types of files, and encrypt each one. Through use of the SMB OPLOCK_BREAK command, a ransomware program may terminate another user's control over a file, thus allowing the ransomware program to lock the file for itself in order to encrypt it.

As indicated in FIG. 3, when the user's command is determined as not deviating from the activity profile for that user, at 340, the SMB command is presumably a normal command such that it may be used to augment user's activity profile. In this manner, a user's activity profile may be progressively constructed from SMB commands that conform to the user's patterns of prior use of SMB commands. The augmented user activity profile may then be used, at 320 in evaluating subsequent SMB commands issued by the user. Through such self-reinforcing training, models of user SMB command activity may be gradually improved, thus improving the ability of the models to detect SMB command patterns that are indicative of ransomware.

At block 345, in scenarios where the user activity is determined to be deviating from a normal behavior, recent SMB commands issued by the user are compared to a library of threat command patterns. In some embodiments, artificial intelligence (AI) algorithms may be used to assess whether the anomalous user activity has features in common with activity which has been designated as patterns of ransomware activity. The patterns of ransomware activity may include patterns of attempts by malicious actors to gain access to the FSS and patterns of ongoing ransomware activity, thus enabling the ability to detect a ransomware attack during any interval at which it may exhibit a distinct pattern of activity. Such patterns of ransomware activity may be compiled by administrator from published threat research, internal analysis, community security platforms. In addition, the library of malware patterns will be augmented through detection and confirmation of any ransomware or other malware activity. In some embodiments, the degree to which a user's SMB command match one or more patterns of malware activity may be characterized by machine learning model through a confidence weight that is assigned to the user's activity, where the confidence weight may be based on the similarity of the user's anomalous activity to one or more patterns of ransomware activity.

In some embodiments, recent SMB commands issued by a user are compared to patterns of command activity that are indicative of ransomware activity and that have been saved in the threat library. For example, a ransomware pattern may include repeated sequences of a QUERY_INFO SMB command followed by an OPLOCK_BREAK SMB command. A QUERY_INFO info command may be used to request available information for an SMB resource, such as a file or an underlying shared volume. For files, the QUERY_INFO command may return information from the file sharing system providing the size and a type of the queried file. As described, the OPLOCK_BREAK allows a user to terminate another user's ongoing access to a file, thus allowing the user issuing the command to take control of the file. In ransomware attacks, QUERY_INFO commands may be used to infer a file's importance. For instance, large files may be deemed more important than smaller files and certain types of files (e.g., source code, spreadsheets, etc.) may be deemed more important that other types of files (e.g., libraries and executables that can be easily replaced). Accordingly, a ransomware attack may be indicted by repeated sequences of QUERY_INFO that are used to identity whether a file should be encrypted and a following OPLOCK_BREAK that allows the ransomware attacker to take control of the file in order to encrypt it.

In another ransomware pattern that may be detected, repeated sequences of TREE_CONNECT SMB commands are directly followed by a READ command, which is directly followed by a WRITE command. This pattern is distinguishable for normal use based on detecting a large volume or frequency of such sequences. A TREE_CONNECT command is issued to request access to a particular SMB file. Once access to the shared file has been granted, READ commands result in the file share system partitioning the file into blocks and transmitting the contents of the file to the user that issued the READ command. While still maintaining access to the shared file, a user may submit a WRITE command with data that will be overwrite the previous file data in the shared file system. In a ransomware attack, large volumes of TREE_CONNECT commands followed directly by READ and WRITE commands indicate a ransomware program that is iterating through selected files, reading the contents of the files, encrypting that content and proceeding to write the encrypted content back to the shared file.

At block 355, in scenarios where the recent SMB commands issued by the user match a pattern of a ransomware attack that is defined in the ransomware library, the FSS immediately terminates the user' SMB session. The FSS may provide administrators with an immediate notification of the termination of the use's SMB session, such as by generating a popup notification and/or alarm. In response to the detection of the match to a ransomware pattern, the FSS may initiate various automatic responses to quarantine the shared storage volumes, shutting down the FSS and/or issuing a notification to disable access the user's access privileges though out the datacenter. Through immediate termination of the user's SMD session by the FSS, a response to the ransomware may be provided in real time, thus preventing any further loss of data. In modern cyber-attacks, human responses cannot happen quickly enough. Through embodiments, emerging ransomware attacks may be detected through automated tools as soon as possible, thus supporting deployment of real-time responses.

If a deviation from the user's normal activity profile is detected, but the deviation does not fit a pattern indicative of ransomware, at 360, the FSS may generate a notification for manual review of the activity by the user. The FSS may additionally or alternatively initiate elevated monitoring procedures with respect to this user. In some embodiments, these procedures may result in the FSS calculating a threat risk parameter with regard to the user. An elevate threat risk parameter may be assigned based on the degree of matching with a pattern from the threat library, based on prior history of deviations by the user, based on volume of commands by the user, based on volume of data and/or files being transacted by the user, etc.

In some embodiments, threat risk parameters assessed by the FSS may be evaluated across all uses being monitored in order to provide improved notifications based on the threat risk parameters. For instance, the collected SMB command deviations may be clustered based on machine learning techniques in order to classify threat risk parameters as being a low, medium or high threat. The threat risk parameters for a user may be automatically updated based on additional commands from that user or from other users. In some embodiments, once a threat risk parameter has been calculated for a user and that risk parameter is above a threshold value or classification, an interface may display such score or classification to the administrators. In some embodiments, the file sharing system may initiate enhanced logging procedures for all commands issued by a user with a threat risk parameter above a certain threshold, where such logging allows all commands from the user to be reversed, thus allowing recovery of any files that are corrupted while this logging is activated.

The FSS may generate various other notifications in scenarios where recent SMB commands issued by the user deviate from normal activity but do not match the patterns of ransomware attacks defined in the library of threat commands. In some embodiments, the FSS may issue a popup notification for administrator review. In some embodiments, a threat risk parameter above a threshold value or classification may result in a popup notification on an administrator interface. In some embodiments, the popup notification presented to an administrator may allow the administrator to designate the observed command pattern as normal, to designate the observed command pattern as suspicious (thus increasing the threat risk parameter for this user) or to immediately terminate the user's session ID and thus their SMB session. In some embodiments, a popup notification may provide an administrator with the ability to view threat risk parameter from prior SMB sessions for that particular user. In some embodiments, the popup notification may present the administrator with current threat risk parameters for all users of the FSS (i.e., all user with an active session), or of a type of user. In some embodiments, the popup notification may provide the administrator for data comparing the threat risk parameter of a user against average threat risk parameter for a type of user, such as other users from the same organization.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

In an embodiment, the FSS can have an automated artificial intelligence (AI) assistant configured to, in-real-time, anticipate the information needs of a human who is conducting cyber threat investigations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for detecting ransomware attacks on an SMB (Server Message Block) file sharing system (FSS), the method comprising:
   authenticating a user's request for access to the SMB file sharing system;
   when the user is successfully authenticated, initiating an SMB session for the user;
   during the SMB session, detecting QUERY_INFO and OPLOCK_BREAK SMB commands issued by the user;
   evaluating the detected QUERY_INFO and OPLOCK_BREAK SMB commands against an activity profile based on SMB commands in prior SBM sessions by the user to identify repeated sequences of a QUERY_INFO command followed directly by an OPLOCK_BREAK command;
   and
   when repeated sequences of a QUERY_INFO command followed directly by an OPLOCK_BREAK command are identified, terminating the user's SMB session.

2. The method of claim 1, wherein the repeated sequences of a QUERY_INFO command followed by an OPLOCK_BREAK command comprises an indication of a ransomware attack via the user's SMB session.

3. The method of claim 1, further comprising detecting TREE_CONNECT, READ and WRITE SMB commands issued by the user during the SMB session.

4. The method of claim 3, further comprising evaluating the detected commands to identify repeated sequences, issued by the user during the SMB session, of a TREE_CONNECT command directly followed by a READ command directly followed by a WRITE command.

5. The method of claim 1, wherein the evaluation of the detected QUERY_INFO and OPLOCK_BREAK SMB commands against the user's activity profile comprises detecting a OPLOCK_BREAK command when the user's activity profile indicates no prior use of OPLOCK_BREAK commands by the user.

6. The method of claim 1, wherein the evaluation of the detected QUERY_INFO and OPLOCK_BREAK SMB commands against the user's activity profile comprises detecting an increase in frequency of SMB commands issued by the user.

7. The method of claim 6, wherein the increase in frequency of SMB commands issued by the user is in comparison to a frequency of SMB commands issued by the user during the prior SBM sessions by the user as reflected in a threat risk parameter assigned to the user.

8. The method of claim 1, wherein the user's request for access to the SMB file sharing system is authenticated by an Active Directory Identity Provider.

9. A computer-readable storage device having instructions stored thereon for detecting ransomware attacks on an SMB (Server Message Block) file sharing system, wherein execution of the instructions by one or more processors causes the one or more processors to:
  authenticate a user's request for access to the SMB file sharing system;
  when the user is successfully authenticated, initiate an SMB session for the user;
  during the SMB session, detect QUERY_INFO and OPLOCK_BREAK SMB commands issued by the user;
  evaluate the detected QUERY_INFO and OPLOCK_BREAK SMB commands against an activity profile based on SMB commands in prior SBM sessions by the user to identify repeated sequences of a QUERY_INFO command followed directly by an OPLOCK_BREAK command;
  and
  when repeated sequences of a QUERY_INFO command followed directly by an OPLOCK_BREAK command are identified, terminate the user's SMB session.

10. The computer-readable storage device of claim 9, wherein the repeated sequences of a QUERY_INFO command followed by an OPLOCK_BREAK command comprises an indication of a ransomware attack via the user's SMB session.

11. The computer-readable storage device of claim 9, wherein execution of the instructions by one or more processors causes the one or more processors to detect TREE_CONNECT, READ and WRITE SMB commands issued by the user during the SMB session.

12. The computer-readable storage device of claim 9, wherein the evaluation of the detected QUERY_INFO and OPLOCK_BREAK SMB commands against the user's activity profile comprises detecting a OPLOCK_BREAK command when the user's activity profile indicates no prior use of OPLOCK_BREAK commands by the user.

13. The computer-readable storage device of claim 9, wherein the evaluation of the detected QUERY_INFO and OPLOCK_BREAK SMB commands against the user's activity profile comprises detecting an increase in frequency of SMB commands issued by the user.

14. The computer-readable storage device of claim 13, wherein the increase in frequency of SMB commands issued by the user is in comparison to a frequency of SMB commands issued by the user during the prior SBM sessions by the user as reflected in a threat risk parameter assigned to the user.

15. The computer-readable storage device of claim 9, wherein the user's request for access to the SMB file sharing system is authenticated by an Active Directory Identity Provider.

16. An FSS (File Sharing System) comprising:
  the plurality of data storage devices configured as shared volumes within an SMB (Server Message Block) file sharing system;
  one or more processors; and
  one or more memory devices coupled to the processors, the memory devices storing computer-readable instructions that, upon execution by the processors, cause applications of the FSS to:
    authenticate a user's request for access to the SMB file sharing system;
    when the user is successfully authenticated, initiate an SMB session for the user;
    during the SMB session, detect QUERY_INFO and OPLOCK_BREAK SMB commands issued by the user;
    evaluate the detected QUERY_INFO and OPLOCK_BREAK SMB commands against an activity profile based on SMB commands in prior SBM sessions by the user to identify repeated sequences of a QUERY_INFO command followed directly by an OPLOCK_BREAK command;
    and
    when repeated sequences of a QUERY_INFO command followed directly by an OPLOCK_BREAK command are identified, terminate the user's SMB session.

17. The FSS of claim 16, wherein the repeated sequences of a QUERY_INFO command followed by an OPLOCK_BREAK command comprises an indication of a ransomware attack via the user's SMB session.

18. The FSS of claim 16, wherein the user's request for access to the SMB file sharing system is authenticated by an Active Directory Identity Provider.

* * * * *